(12) United States Patent
Lindholdt

(10) Patent No.: US 6,749,037 B2
(45) Date of Patent: Jun. 15, 2004

(54) VEHICLE DRIVING ARRANGEMENT

(75) Inventor: Per Nielsen Lindholdt, Sønderborg (DK)

(73) Assignee: Sauer-Danfoss Holding A/S, Nordborg (DE)

(*) Notice: Subject to any disclaimer, the term of this patent is extended or adjusted under 35 U.S.C. 154(b) by 0 days.

(21) Appl. No.: 09/863,642

(22) Filed: May 23, 2001

(65) Prior Publication Data

US 2001/0045313 A1 Nov. 29, 2001

(30) Foreign Application Priority Data

May 23, 2000 (DE) .......................... 100 25 508

(51) Int. Cl.[7] .............................. B60K 17/356
(52) U.S. Cl. ................. 180/242; 180/197; 180/305; 56/10.9
(58) Field of Search ................. 180/197, 212, 180/242, 243, 244, 245, 305, 307, 308; 56/10.9, 14.7, DIG. 11

(56) References Cited

U.S. PATENT DOCUMENTS

| | | | | |
|---|---|---|---|---|
| 4,395,878 A | * | 8/1983 | Morita et al. ............... | 180/307 |
| 4,494,624 A | | 1/1985 | Scheuerle | |
| 4,696,367 A | * | 9/1987 | Delfs ......................... | 180/307 |
| 5,199,525 A | * | 4/1993 | Schueler .................... | 180/242 |
| 5,201,570 A | * | 4/1993 | Heren et al. ................ | 180/197 |
| 5,427,195 A | * | 6/1995 | Paul et al. .................. | 180/308 |
| 5,682,958 A | | 11/1997 | Kalhorn | |
| 5,715,664 A | * | 2/1998 | Sallstrom et al. ............ | 180/242 |
| 5,730,041 A | * | 3/1998 | Fillion et al. ............... | 180/197 |
| 6,119,802 A | * | 9/2000 | Puett, Jr. .................... | 180/242 |
| 6,176,084 B1 | * | 1/2001 | Ehn, Jr. ...................... | 180/243 |
| 6,267,163 B1 | * | 7/2001 | Holmes ...................... | 180/242 |
| 6,269,901 B1 | * | 8/2001 | Moffett et al. .............. | 180/308 |
| 6,276,468 B1 | * | 8/2001 | Essig et al. .................. | 180/307 |
| 6,338,247 B1 | | 1/2002 | Drin | |
| 6,354,392 B1 | * | 3/2002 | Cousin et al. .............. | 180/242 |
| 6,382,340 B1 | * | 5/2002 | McKenna et al. .......... | 180/308 |
| 6,405,514 B1 | * | 6/2002 | Guertin ....................... | 56/10.9 |
| 6,408,972 B1 | * | 6/2002 | Rodgers et al. ............. | 180/197 |

FOREIGN PATENT DOCUMENTS

| | | |
|---|---|---|
| DE | 4211323 | 10/1993 |
| EP | 0627335 | 12/1994 |

* cited by examiner

*Primary Examiner*—Brian L. Johnson
*Assistant Examiner*—Christopher Bottorff
(74) *Attorney, Agent, or Firm*—Barnes & Thornburg LLP

(57) ABSTRACT

A vehicle driving arrangement with at least two axes, each having at least one driven wheel that can be acted upon with a torque of a motor, the motor/motors of each axis being arranged in a supply line, the supply lines being parallel to each other and connected with a pump device, and a valve arrangement being arranged in at least one supply line. It is desired to improve the operability of a hydraulically driven vehicle. For this purpose, the valve arrangement in one supply line has a pressure reducing valve that limits the pressure difference over the other supply line to a maximum value.

13 Claims, 3 Drawing Sheets

VEHICLE DRIVING ARRANGEMENT

BACKGROUND OF THE INVENTION

The invention concerns a vehicle driving arrangement with at least two axes, each having at least one driven wheel that can be acted upon with a torque of a motor, the motor/motors of each axis being arranged in a supply line, the supply lines being parallel to each other and connected with a pump device, and a valve arrangement being arranged in at least one supply line.

In certain operating situations, a problem occurs in connection with such hydraulic driving arrangements. It can, for example, appear during downhill driving, when the load acting on the front axis is larger than that acting on the rear axis. The driving motors then work as pumps, producing a pressure, which can be higher than the pressure of the pump device. Due to the different frictional contact of the wheels with the ground, caused by the different loads, it may now happen that the flow direction at the motors of a less loaded axis changes and the connected wheels start turning against the driving direction. To avoid this so-called backspin effect, some vehicle driving arrangements are provided with corresponding anti-backspin arrangements.

Such a vehicle driving arrangement is known from U.S. Pat. No. 5,199,525. Between the pump device and motor (rear wheel) that is critical with respect to back-spin effect, this driving arrangement has a pressure controlled valve arrangement. When a pressure difference of the supply line of the rear wheel reaches a preset value, which is set via a spring, the valve changes its position. In this position, the pressure admission of the rear wheel motor is interrupted by the pump device, and is now idling. This displacement of the valve arrangement occurs, for example, when the vehicle is driving forward downhill, and the pressure supplied by the motors of the front axis is higher than the pressure, with which the pump device acts upon the motors. In such a situation, the pressure controlled valve arrangement prevents the rear wheel from spinning against the driving direction, as soon as there is not sufficient frictional contact between wheel and ground (back-spin effect).

In such a driving arrangement the risk that a back-spin effect appears is effectively reduced, however, at the expense of the braking power of the rear wheel, which, in a corresponding situation merely runs along freely. After the position change of the valve arrangement, the reduction of the number of driven wheels on the motors of the remaining driven wheels may additionally cause a pressure increase. This causes an instantaneous increase in the speed.

SUMMARY OF THE INVENTION

The invention is based on the task of improving the operation of a hydraulically driven vehicle.

With a driving device as mentioned in the introduction, this task is solved in that the valve arrangement in one supply line has a pressure reducing valve that limits the pressure difference over the other supply line to a maximum value.

Firstly, this ensures an arrangement, which can prevent the spinning in the opposite direction of the driving direction of the wheels of an axis, which is liable to having a back-spin effect. In this connection, the arrangement works in a purely hydro mechanical mode, which reduces the costs, and thus also enables an economically sound use in simple vehicles. With a driving device according to the invention, a braking power can still be generated by the axis liable to having a back-spin effect, also when the anti-back-spin function is activated. In such a situation, this provides the vehicle with a higher braking power from the drive, which again improves the operating convenience and the safety of the vehicle. The pressure over the other axis remains substantially unchanged. Thus no instantaneous speed increase occurs.

It is advantageous that, in dependence of a predetermined frictional contact between the wheel driven by a motor, which is submitted to the limited pressure difference, and a ground, the maximum value is chosen so that during the anticipated operation a slip between the wheel and the ground will not occur. In this way, the braking power of the axis liable to back-spin is available for all imaginable operating conditions, also when the anti-back-spin function is activated. Thus, for the anticipated use of the vehicle, for example with regard to ground gradients and ground properties, a good operating convenience and a sufficient safety are ensured under all circumstances.

It is advantageous that the pressure difference of a supply line can only be limited, when in connection with at least one motor the pressure from the pump device, which acts upon this motor, is lower than the pressure, which is supplied by the motor. Thus, it is ensured that the pressure difference of a supply line is only limited, when there is a risk of a back-spin effect on the corresponding axis.

During the rest of the operation of the driving device, the full pressure difference is available, which ensures an improved utilisation of the pressure of the pump device, which again reduces the operating costs.

Further, it is advantageous that the valve arrangement limits the pressure in one direction over the pressure reducing valve to the maximum value, and in the other direction passes it on unchanged. In this way, it is ensured that the pressure reduction by the valve arrangement only occurs in one flow direction. In the opposite flow direction, for example when reversing, a motor of the own supply line is connected downstream of the valve arrangement, the motor thus being acted upon by the full pressure available. Thus, the highest possible pressure of the at least one motor keeps the pressure difference of this supply line, which can cause the back-spin effect, at the lowest possible level. Further, this causes that during normal operation the full pressure is available for driving the vehicle, which again reduces the operating costs.

Additionally, it is advantageous that the valve arrangement has a non-return valve arranged in parallel with the pressure reducing valve and opening in a flow direction, in which a pressure reduction shall not take place. In such an arrangement, all components of the complete valve arrangement have a simple design. This firstly reduces the costs of the driving arrangement, and secondly, the components are less susceptible to faults, which ensures a high operating reliability.

Preferably, in connection with forward driving, the pressure difference over the supply line of the rear axis in the driving direction (the rear axis of the vehicle) can be limited to the maximum value by the valve arrangement. As, in connection with forward driving downhill, the normal force acting upon the ground via the rear axis and its wheels is lower than the one acting via the front axis of the vehicle, the risk of a back-spin effect mainly exists for the rear axis. Thus, the limitation of the pressure difference over the supply line of the rear axis means a substantial reduction of the risk of back-spin.

In another preferred embodiment, the pressure difference over the supply line of the rear axis during reversing (the front axis of the vehicle) can be limited by a second valve arrangement. Thus, additionally, the risk of the occurrence of a back-spin effect also in connection with reversing is substantially avoided.

It is advantageous that the pressure reduction valve is adjustable. In this way, the driving device can be adjusted to the anticipated operating conditions of each individual vehicle. Thus, an optimised braking power of the drive can be set in dependence of the risk of the occurrence of a back-spin effect.

It is advantageous that the pressure reduction valve is adjustable through the pump device. Through this measure, a constant braking power of at least one of the wheels of the axis in question is adjustable when the anti-back-spin function is active, independently of the pressure supplied by the pump device at the given time. Thus, the anti-back-spin function of the driving arrangement can be adjusted even more precisely to the anticipated operating conditions.

Further, it is advantageous that the pump device has a variable pump. The use of the variable pump enables the pressure admission on the remaining driving device in two directions with a small room requirement of the pump device. Thus, both room and weight are saved.

Further, it is favourable that two motors are arranged on one axis, the motors being acted upon with pressure via the supply line of the axis. Thus, also two wheels are driven on one axis, which ensures a stable and uniform driving of the vehicle.

Preferably, both motors of an axis are arranged in parallel with each other in the supply line. The parallel connection of the motors causes that the fluid flow through the motor with the smaller resistance is larger than that through the motor with the larger resistance. In this way, for example in connection with curve driving, the fluid is distributed according to the need of both motors of an axis, which makes the driving via both wheels more uniform and thus ensures more stable driving qualities.

In another preferred embodiment, both motors of an axis are arranged in series in the supply line. The series connection of the two motors causes that the fluid flow through both motors is the same. Thus, the pressure is distributed on the resistances of the individual motors. If one of the driven wheels starts spinning, this wheel will only receive a relatively low pressure. The vehicle can thus be driven via the wheel of the other motor, at which a pressure corresponding to its resistance is still available.

BRIEF DESCRIPTION OF THE DRAWINGS

In the following, the invention is described on the basis of a preferred embodiment in connection with the drawings, showing.

DESCRIPTION OF THE PREFERRED EMBODIMENTS

Figure 1:
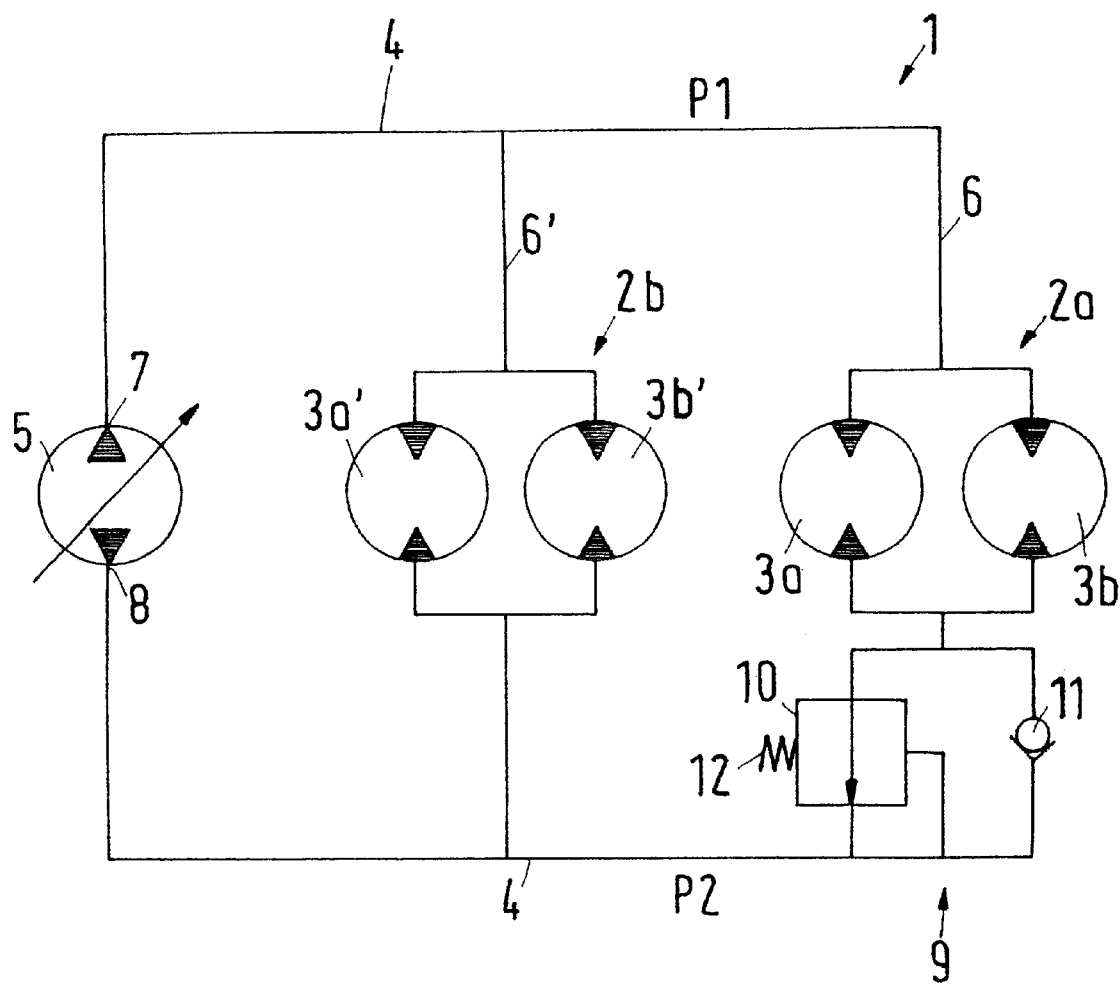
FIG. 1 a schematic circuit diagram of a driving arrangement with anti-back-spin function on the rear axis FIG. 2 a schematic circuit diagram of a driving arrangement with anti-back-spin function on the front axis and the rear axis and with series-connected motors FIG. 3 a schematic circuit diagram of a driving arrangement with 3-wheel drive and anti-back-spin function on the front axis and the rear axis FIG. 4a a diagram showing the braking power build-up when activating a known anti-back-spin function FIG. 4b a diagram showing the braking power build-up when activating an anti-back-spin function according to the invention

FIG. 1 shows a vehicle driving arrangement 1 with two axes 2a, 2b, each provided with two motors 3a, 3b and 3a', 3b', respectively. Each of these motors 3a, 3b and 3a', 3b', respectively, acts upon one wheel (not shown) with a torque. In this connection, the motors 3a, 3b and 3a', 3b', respectively, of one axis 2a, 2b are arranged in parallel with each other.

The motors 3a, 3b and 3a', 3b', respectively, connected with a pump 5 via a line arrangement 4. For each axis 2a, 2b the line arrangement 4 has a supply line 6, 6', in which both motors 3a, 3b and 3a', 3b', respectively, are arranged in parallel with each other. For this purpose, the supply line 6, 6' branches off before the two motors 3a, 3b and 3a', 3b', respectively, and unites again after the motors. Via the supply lines 6, 6', the motors 3a, 3b and 3a', 3b', respectively, of an axis 2a, 2b are acted upon by a pressure. The pump 5 supplies a pressurised fluid from a high pressure connection 7 via the line arrangement 4 with the motors 3a, 3b and 3a', 3b', respectively, in the supply lines 6, 6' back to a low pressure connection 8.

During normal operation this causes the building up of a high pressure P1 in the supply lines 6, 6' of the two axes 2a, 2b on the side of the high pressure connection 7, which pressure P1 is higher than a low pressure P2 on the side of the low pressure connection 8. In this connection, the pressurised fluid in both supply lines 6, 6' flows from the side of the high pressure connection 7 to the side of the low pressure connection 8 due to the pressure drop between the high pressure P1 and the low pressure P2. Please note that the term "high pressure connection" merely refers to the working connection by which the pressurised fluid is supplied during forward driving. Accordingly, the term "low pressure connection" refers to the working connection to which the pressurised fluid flows back during forward driving. Equally, the term "high pressure" merely refers to the pressure at the "high pressure connection" and "low pressure" refers to the pressure at the "low pressure connection". However, during reversing, this does not prevent the pressurised fluid from being delivered by the "low pressure connection" and flowing back to the "high pressure connection", or the "low pressure" from having a higher value than the "high pressure".

During forward driving downhill it may happen that the motors 3a, 3b are driven faster by their individual rolling wheels than via the pressurised fluid of the pump 5. Thus, the amount of pressurised fluid supplied by the motors 3a, 3b exceeds the amount that can be replenished by the pump 5. Consequently, a higher pressure now builds up on the side of the low pressure connection 8 than on the side of the high pressure connection 7. Additionally, in connection with downhill driving, the load on the rear axis 2b will often be smaller than the load on the front axis 2a. For the wheels of the rear axis 2b the reduced normal force will cause a poorer frictional contact between the wheels of the rear axis 2b and a ground than between the wheels of the front axis 2a and the ground. In this situation, it is possible that the pressure difference over the supply line 6' of the rear axis 2b overcomes the frictional contact between the wheels of the rear axis 2b and the ground, so that now the pressurised fluid flows from the side of the low pressure connection 8 via the supply line 6' and the motors 3a', 3b' of the rear axis 2b to the side of the high pressure connection 7. Thus, the motors 3a', 3b' and the wheels of the rear axis 2b will be driven against the driving direction (back-spin effect).

To avoid this situation during forward driving, the vehicle driving arrangement 1 of FIG. 1 has a valve arrangement 9 in the supply line 6 of the front axis 2a on the side of the low pressure connection 8. A pressure reduction valve 10 and a non-return valve 11 are arranged in this valve arrangement 9. The pressure reduction valve 10 is adjustable via a spring 12 and limits the pressure of the pressurised fluid supplied by the motors 3a, 3b of the front axis 2a in the direction of the low pressure connection 8 to a maximum value. The non-return valve 11, which is arranged in parallel with the pressure reduction valve 10, is closed in this flow direction of the pressurised fluid. In the opposite flow direction through the valve arrangement 9 (on reversing), the pressurised fluid flows through the now opened non-return valve 11. Alternatively to the valve arrangement 9, a pressure reduction valve can be used that has a pressure reducing effect only in the one direction and lets the fluid flow freely in the opposite direction.

Due to the pressure reduction valve 10, the building up of the low pressure P2 through the motors 3a, 3b of the front axis 2a on forward driving is limited. The maximum value of the pressure supplied by the pressure reduction valve 10 in this connection is adjustable via the spring 12 in such a way that, in all anticipated operating situations, the pressure difference over the supply line 6' of the rear axis 2b remains so small that in connection with forward driving, the torque of the wheels on the rear axis 2b, counteracting the driving direction, does not overcome the frictional contact between the wheels of the rear axis 2b and the ground. Thus, it is ensured that in any driving situation, the wheels of the rear axis 2b are turning in the driving direction, due to either the motors 3a', 3b' or to the frictional contact of the wheels with the ground. Thus, the back-spin effect on the rear axis 2b can be prevented, which is susceptible in connection with forward driving of the vehicle, particularly downhill driving.

However, also with activated pressure reduction, a low pressure P2 is built up on the side of the low pressure connection 8 of the supply line 6' of the rear axis 2b, which low pressure P2 is higher than the high pressure P1 on the side of the high pressure connection 7 of the same supply line 6'. Thus, a pressure difference remains over the supply line 6' that generates a torque via the motors 3a', 3b' of the rear axis 2b, which torque counteracts the rolling direction of the wheels and thus has a braking effect. Additionally, the size of the pressure reduction through the pressure reduction valve 10 can be set to be higher than the pressure supplied by the pump 5 (high pressure P1). Thus, a pressure difference can be set over the supply line 6' of the rear axis 2b, which always maintains a constant value on activation of the anti-back-spin function, regardless of the instantaneous pump output.

The vehicle driving arrangement 1 with the valve arrangement 9 according to the invention thus has a maximum braking power of the drive, which, contrary to the braking power of the vehicle driving arrangement in U.S. Pat. No. 5,199,525, is kept at a constant value.

Figure 4A:
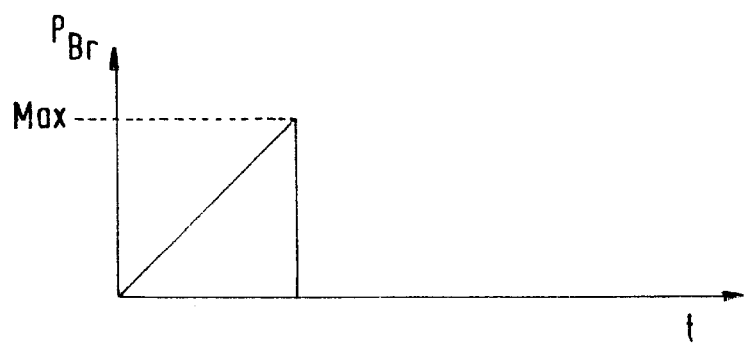
Figure 4B:
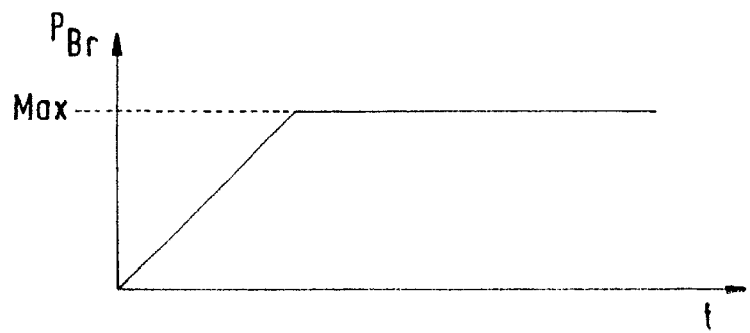

FIGS. 4a and 4b show the courses of the drive braking power ($P_{Br}$) over the time (t) on an axis with anti-back-spin function. In this connection, the maximum value (Max) of the drive braking power is determined by the activation of the anti-back-spin function.

FIG. 4a shows the course with a vehicle driving arrangement as known, for example, from U.S. Pat. No. 5,199,525. Here, the wheel in question merely rolls along in the driving direction, when the anti-back-spin function has been activated. The braking power of the drive via this wheel is thus reduced to zero.

Contrary to this, as shown in FIG. 4b, the braking power after activation of the anti-back-spin function in the driving arrangement according to the invention remains at the maximum value (Max). Thus, a corresponding wheel also has a braking effect after the activation of the anti-backspin function.

Figure 2:
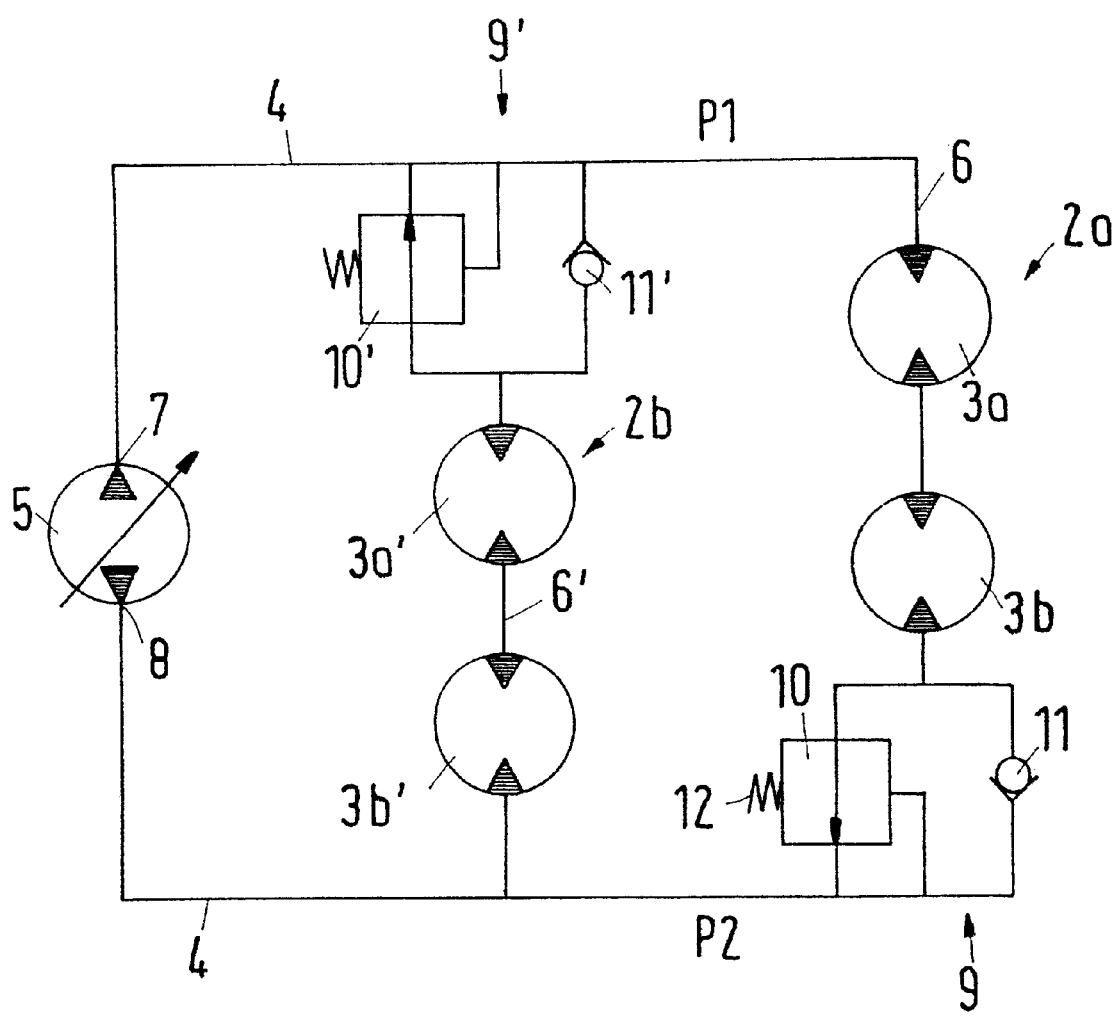

FIG. 2 shows a vehicle driving arrangement 1 having a second valve arrangement 9'. This is arranged in the supply line 6' of the rear axis 2b, so that on forward driving it lies ahead of the motors 3a', 3b' of the rear axis 2b in the flow direction. The non-return valve 11' of the second valve arrangement 9' is open in this flow direction. Thus, on normal forward driving, the pressure reduction valve 10' of the second valve arrangement 9' causes no pressure reduction.

During normal reversing, the flow direction of the pressurized fluid is opposite. Here, however, the low pressure P2 on the side of the low pressure connection 8 is higher than the high pressure P1 on the side of the high pressure connection 7. Therefore, the pressurized fluid now flows from the side of the low pressure P2 via the motors 3a, 3b or 3a', 3b', respectively, in the supply lines 6, 6' of both axes 2a, 2b to the side of the high pressure P1. The valve arrangement 9 of the supply line 6 of the front axis 2a is arranged ahead of the motors 3a, 3b of the front axis 2a in the flow direction, meaning that the flow through the valve arrangement takes place via the now opened non-return valve 11.

Contrary to this, the valve arrangement 9' of the supply line 6' of the rear axis 2b now lies in the flow direction after the motors 3a', 3b' of the rear axis 2b. In this connection, the non-return valve 11' is closed in the flow direction, so that the flow through the valve arrangement 9' takes place via the pressure reduction valve 10'.

During reversing downhill, now the wheels of the front axis 2a of the vehicle are particularly susceptible to back-spin, as here, in many cases, the load on the front axis 2a of the vehicle is smaller than that on the rear axis 2b. Corresponding to the example described above, the fast turning wheels of the motors 3a', 3b' of the rear axis 2b could cause a building up of a high pressure P1, which is higher than the low pressure P2', which could cause a back-spin effect on the motors 3a, 3b of the front axis 2a.

To avoid this, the pressure passed on by the motors 3a', 3b' of the rear axis 2b to the side of the high pressure connection 7 is limited to a maximum value via the pressure reduction valve 10'. This maximum value prevents the pressure difference over the motors 3a, 3b of the front axis 2a from becoming so large that the frictional contact between the wheels of the front axis 2a and the ground is overcome.

Through this arrangement with two valve arrangements 9, 9', a back-spin effect in connection with downhill driving, on both forward driving and reversing, is reduced. On forward driving, the anti-back-spin function for this embodiment occurs in accordance with the example described above via the valve arrangement 9, whereas the flow through the valve arrangement 9' appears through the now opened non-return valve 11.

Additionally, in the embodiment according to FIG. 2, the motors 3a, 3b and 3a', 3b', respectively, in the supply lines 6, 6' of the two axes 2a, 2b are arranged in series. Thus, the pressure drop over each motor 3a, 3b and 3a', 3b', respectively, adapts itself in accordance with the resistance of each motor. When one single wheel of an axis 2a, 2b starts spinning, this only causes a small pressure drop on the corresponding motor in relation to the other motor 3a, 3b or 3a', 3b' of the axis.

Figure 3:
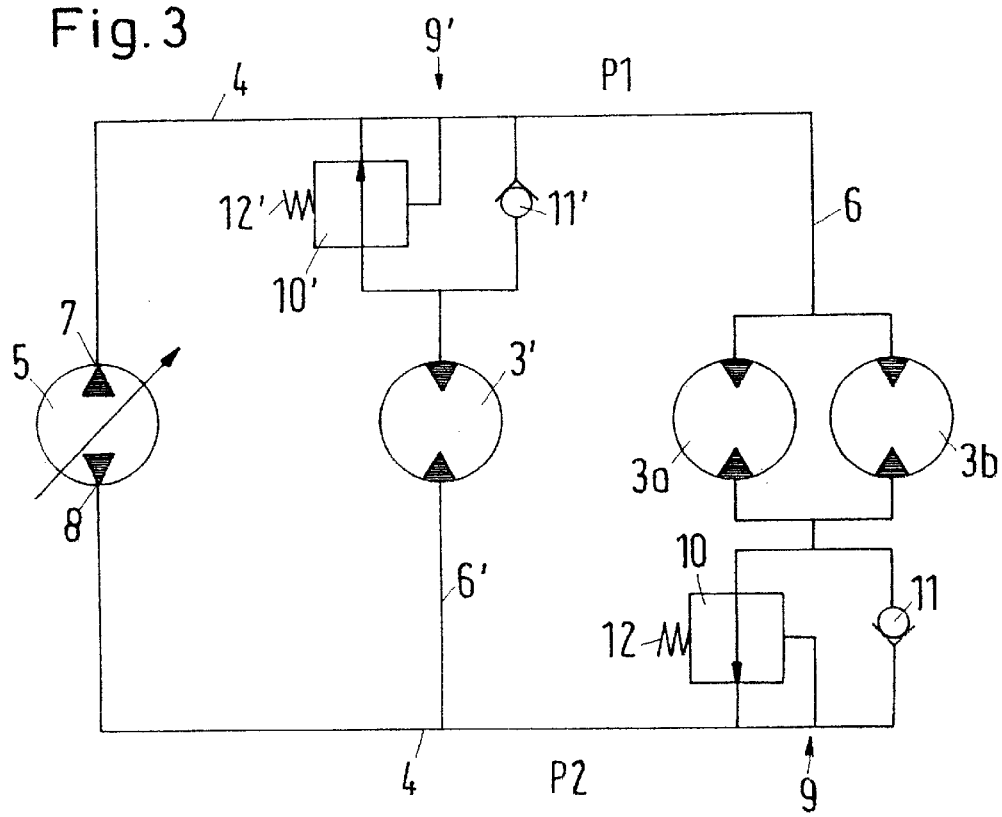

FIG. 3 shows a vehicle driving arrangement 1 according to the invention for a three-wheel vehicle. Also in this embodiment each axis 2a, 2b has a valve arrangement 9, 9'. Thus, an anti-back-spin function is available for this vehicle both on forward driving and on reversing. Differences in relation to the embodiment in FIG. 2 merely appear in the different dimensioning fundamentals. These occur, as the total oil amount on one axis is led through one single motor 3'. However, this has no influence on the principal working mode of the valve arrangements 9, 9'.

What is claimed is:

1. Vehicle driving arrangement with at least two axes including a front axis and a rear axis, each axis having at least one drive wheel that can be acted upon with a torque of a motor, the motors of each axis being arranged in a supply line, the supply lines of each axis being parallel to each other and connected with a pump device, and a valve arrangement being located in at least one supply line for preventing backspin of an uphill one of said axes when the vehicle is moving downhill, one said valve arrangement being located in the front axis of said motors on a low pressure side of said pump device and having a pressure reducing valve that limits a pressure difference over the supply line to a maximum value in the rear axis when the vehicle is moving downhill.

2. Vehicle driving arrangement according to claim 1, in which, in dependence on a predetermined frictional contact between the wheel driven by a motor, which is subjected to the pressure difference, and a ground, the maximum value is selected so that during operation a slip between the wheel and the ground will not occur.

3. Vehicle driving arrangement according to claim 1, in which the pressure reducing valve includes means to limit the pressure difference of a supply line only when the pressure from the pump device, which acts upon the motor, is lower than the pressure which is supplied by the motor.

4. Vehicle driving arrangement according to claim 1, in which the valve arrangement includes means to limit the pressure in one direction over the pressure reducing valve to the maximum value, and in the other direction it passes the pressure on unchanged.

5. Vehicle driving arrangement according to claim 1, in which the valve arrangement has a non-return valve located in parallel with the pressure reducing valve and opening in a flow direction, in which a pressure reduction shall not take place.

6. Vehicle driving arrangement according to claim 1, in which in connection with forward driving, the pressure difference over the supply line of the rear axis in relation to the driving direction can be limited to the maximum value by the valve arrangement.

7. Vehicle driving arrangement according to claim 1, in which the pressure difference over the supply line of the front axis during reversing is limited by a second valve arrangement.

8. Vehicle driving arrangement according to claim 1, in which the pressure reduction valve is adjustable.

9. Vehicle driving arrangement according to claim 1, in which the pressure reduction valve is adjustable through the pump device.

10. Vehicle driving arrangement according to claim 1, in which the pump device is a variable pump.

11. Vehicle driving arrangement according to claim 1, including two motors located on one axis, the motors being acted upon with pressure via the supply line of the axis.

12. Vehicle driving arrangement according to claim 11, in which both motors of an axis are arranged in parallel with each other in the supply line.

13. Vehicle driving arrangement according to claim 11, in which both motors of an axis are arranged in series in the supply line.

* * * * *